(12) United States Patent
Aposotolos et al.

(10) Patent No.: US 10,686,497 B2
(45) Date of Patent: Jun. 16, 2020

(54) DIRECTIONAL MIMO ANTENNA

(71) Applicant: Antenum, Inc., Merrimack, NH (US)

(72) Inventors: John T. Apostolos, Lyndeborough, NH (US); William Mouyos, Windham, NH (US)

(73) Assignee: Antenum, Inc., Merrimack, NH (US)

( * ) Notice: Subject to any disclaimer, the term of this patent is extended or adjusted under 35 U.S.C. 154(b) by 0 days.

(21) Appl. No.: 15/903,115

(22) Filed: Feb. 23, 2018

(65) Prior Publication Data

US 2018/0287671 A1    Oct. 4, 2018

Related U.S. Application Data

(60) Provisional application No. 62/463,076, filed on Feb. 24, 2017.

(51) Int. Cl.
| | |
|---|---|
| *H04B 7/04* | (2017.01) |
| *H04B 7/0413* | (2017.01) |
| *H04L 5/00* | (2006.01) |
| *H01Q 21/26* | (2006.01) |
| *G01S 5/12* | (2006.01) |
| *H04L 5/06* | (2006.01) |
| *H04W 64/00* | (2009.01) |

(52) U.S. Cl.
CPC .............. *H04B 7/0413* (2013.01); *G01S 5/12* (2013.01); *H01Q 21/26* (2013.01); *H04L 5/0048* (2013.01); *H04L 5/0051* (2013.01); *H04L 5/06* (2013.01); *H04W 64/003* (2013.01)

(58) Field of Classification Search
CPC ....... H04B 7/0413; H04B 7/04; H04L 5/0051; H04L 5/0048; H04L 5/06; G01S 5/12; H01Q 21/26

USPC .......................................................... 375/262
See application file for complete search history.

(56) References Cited

U.S. PATENT DOCUMENTS

| | | | |
|---|---|---|---|
| 5,717,406 A * | 2/1998 | Sanderford | G01S 1/022 |
| | | | 342/363 |
| 6,144,711 A | 11/2000 | Raleigh et al. | |
| 9,013,360 B1 * | 4/2015 | Apostolos | H01Q 9/06 |
| | | | 343/793 |
| 9,088,447 B1 | 7/2015 | Koike-Akino et al. | |
| 9,118,116 B2 | 8/2015 | Apostolos et al. | |
| 9,374,140 B2 | 6/2016 | Salonidis et al. | |
| 2004/0136349 A1 | 7/2004 | Walton et al. | |
| 2006/0023803 A1 | 2/2006 | Perlam et al. | |
| 2008/0080631 A1 | 4/2008 | Forenza et al. | |
| 2014/0098689 A1 * | 4/2014 | Lee | H04B 7/0469 |
| | | | 370/252 |
| 2016/0191130 A1 * | 6/2016 | Bengtsson | H04B 7/0615 |
| | | | 375/267 |

OTHER PUBLICATIONS

Marom et al., "MIMO Systems with One Directional Antenna," IEEE 26th Convention of Electrical and Electronics Engineers in Israel (2010).

(Continued)

*Primary Examiner* — Kevin M Burd

(74) *Attorney, Agent, or Firm* — David J. Thibodeau, Jr.; VLP Law Group LLP

(57) ABSTRACT

A Multiple Input Multiple Output (MIMO) antenna system and operating method that provides spatial- and temporal multiplexing with polarization independent operating modes.

4 Claims, 11 Drawing Sheets

(56) References Cited

OTHER PUBLICATIONS

Gonzalex, Alejandro Nieto, "Dual Polarized Omnidirectional Array Element for MIMO Systems," Master of Science Thesis, Stockholm, Sweden (2005).

International Search Report and Written Opinion dated Jun. 20, 2018 for International Application No. PCT/US2018/019317 filed Feb. 23, 2018.

* cited by examiner

PRIOR ART

DIRECTIONAL MIMO ANTENNA

CROSS REFERENCE TO RELATED APPLICATIONS

This application claims priority to a U.S. Provisional Patent Application entitled "Directional MIMO Antenna", Ser. No. 62/463,076 filed Feb. 24, 2017, the entire contents of which are hereby incorporated by reference herein.

BACKGROUND

Multiple-input and multiple-output (MIMO) is a method for increasing the capacity of a radio link using multiple transmit and receive antennas to exploit multipath propagation. MIMO techniques are now in use for many wireless communication standards including IEEE 802.11n (Wi-Fi), IEEE 802.11ac (Wi-Fi), HSPA+(3G), WiMAX (4G), and Long Term Evolution (LTE) (4G). MIMO methods have also been applied and proposed to other uses where multipath is possible, such as power-line communication as per the ITU G.hn standard, the HomePlug AV2 specification and certain Bluetooth environments.

SUMMARY

A MIMO system provides spatial- and time-multiplexing with polarization independent operating modes through the use of channel estimation, coherent processing in an operating mode, and beamforming networks.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
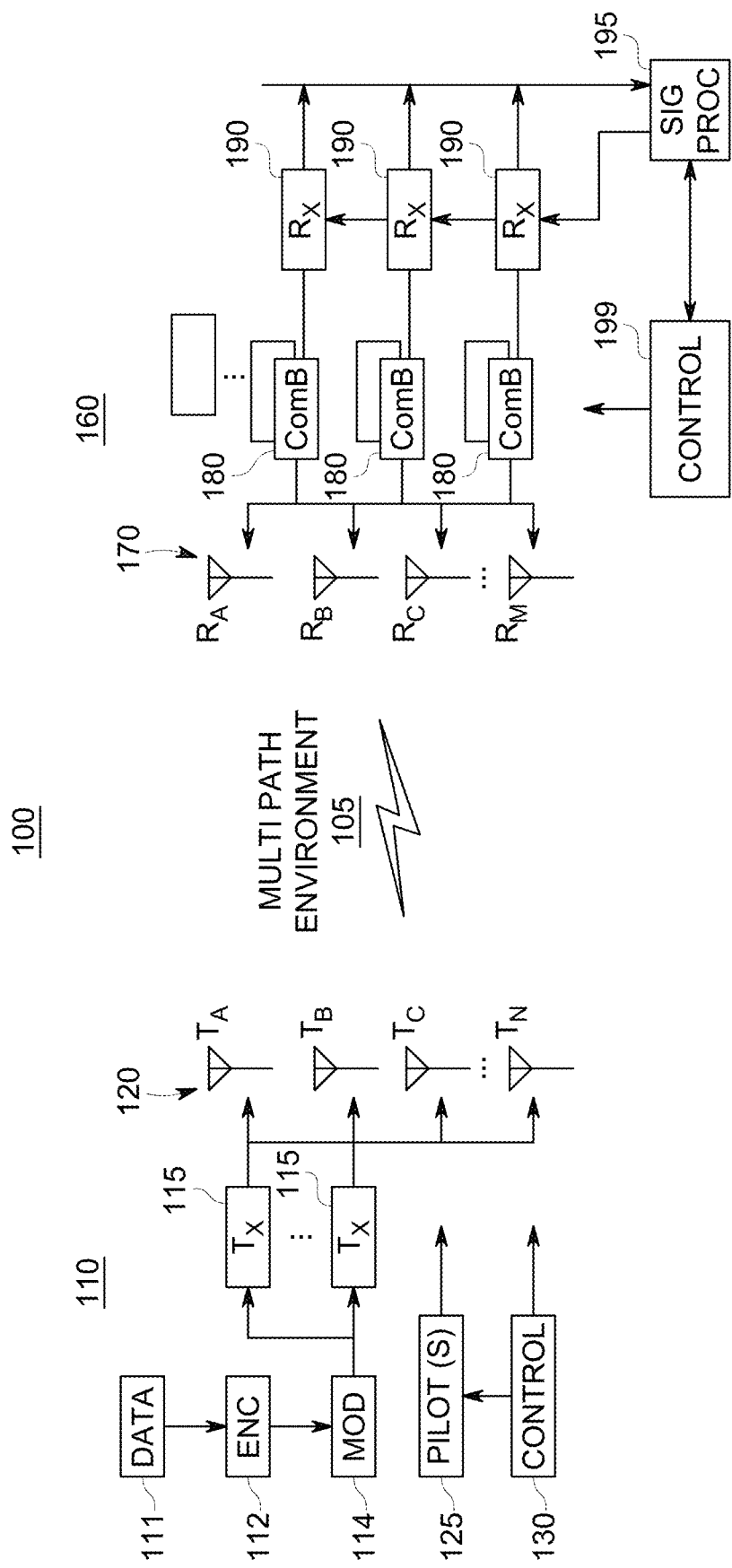
FIG. 1 illustrates a MIMO system in a multipath environment.

FIG. 1 illustrates a MIMO system 100 that may be used in a multipath environment 105. The components of a transmitter 110 subsystem (shown on the left hand side) include one or more transmit data sources 111, one or more encoders 112, one or more modulators 114 and/or transmitters 115, and multiple transmit antennas 120 ($T_A$, $T_B$, $T_C$, $T_N$). A controller 130, such as microprocessor, manages the operation of the transmitter components. The controller 130 operates the system in a training mode, where pilot signals 125 are transmitted via the antennas 120, and an operating mode, where the encoded data is transmitted via the antennas 120. The number of active transmitters 115 may or may not be the same as the number of antennas 120, depending upon the state of the system.

The receiver subsystem 160 components, including two or more receive antennas 270 ($R_A$, $R_B$, $R_C$, $R_M$), one or more receivers 190 (which may include demodulators), and receive signal processor 195. A controller 199, such as a microprocessor, is also used on the receiver side. In some embodiments, at least one combining circuit 180 is associated with each antenna 170 to provide polarization diversity, or to estimate an elevation and angle of arrival, or both.

In some implementations such as for mobile telephone, the transmitter 110 is located in a base station and the receiver 160 is in a mobile phone; however it should be understood that the transmitter 110 may also be in the mobile phone and the receiver in a base station 160, or in other implementations, a transmitter 110 and receiver 160 are located in each wireless device. Thus it should be understood that the transmitter and receiver may each be implemented in a base station or a mobile phone, and that other types of wireless communication networks may utilize the system components in a tablet computer, a laptop computer, a smart watch, an Internet of Things (IoT) device, or any other wireless device.

The MIMO system 100 operates in a multipath environment 105 such that a signal radiated by the transmit antenna(s) 120 may follow multiple paths before arriving at one or more of the receive antenna(s) 170.

Spatial multiplexing using MIMO with multiple antennas at both the transmitter 110 and the receiver 160 can take advantage of the extra degrees of freedom provided by the independent propagation paths present in a multipath environment. In particular, such spatial multiplexing allows sending independent streams of information at the same time over the same frequencies.

An effective way to leverage this situation to provide a multiplex operating mode is to obtain an estimate of channel state information between the transmit and receive antennas by sending orthogonal pilot sequences 125 in a training mode. For this to work the correlation between the temporal frequency transfer functions of the different propagation paths should be low enough to create independent channels.

In the training mode, the controller 130 on the transmit side sets up the transmitter 110 to at first radiate using only one of the antennas, such as antenna $T_A$. The receiver 160 is placed by its controller 199 in a scanning mode, looking for the pilot signal, and to note an angle of arrival (AOA) and time of arrival (TOA) for the pilot signal received from antenna $T_A$. Next, the controller activates only antenna $T_B$ for radiation, and the receiver is again placed in a scanning mode, to note an AOA and TOA for the pilot signal received from antenna $T_B$. The process is repeated for other transmit antennas, $T_C$ through $T_N$. More details regarding one way to estimate AOA are described below. TOA can be estimated with time stamps added to the signals, or with an estimate of phase, as also described below.

Due to spatial coherence, optimum gains from spatial multiplexing alone may not be realized, in that propagation is not random as a function of angle of arrival, but exhibits local maxima.

Figure 2:
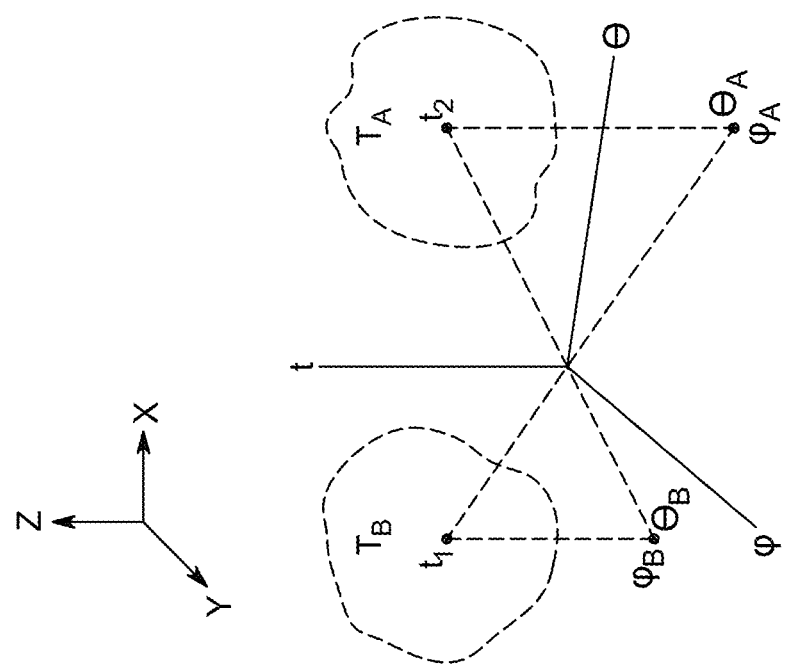
FIG. 2 illustrates regions of coherence for signals emitted from a first antenna and a second antenna B that can be used to develop spatial- and time-multiplexing.

The resulting information regarding spatial frequency (angle of arrival) and temporal frequency (time of arrival) may be used to form a 3-D processing domain as represented in FIG. 2. The x-axis represents elevation angle of arrival ($\phi$) and the y-axis represents the azimuthal angle ($\varphi$) angle arrival. The z-axis represents time of arrival. A region of coherence for signals emitted from antenna $T_A$ is formed around angle ($\varphi_A$, $\phi_A$) at height (time) $t_1$; similarly, a region of coherence for signals emitted from antenna $T_B$ is formed around angle ($\varphi_B$, $\phi_B$) at time $t_2$.

In an operating mode, it is then possible to optimize the performance over a wide range of coherence conditions where two or more of the transmit antennas are activated. In particular, the observed responses to the pilot sequences are used to devise transfer functions in spatial and temporal frequency domains. These transfer functions are the used by the signal processor 195 for coherent receiver processing during the operating mode. In particular, the signal processor 195 may implement one or more matched filters or receiver correlators in the operating mode. Thus during normal operation two or more antennas $T_A$, ... $T_N$ may be active on the transmit side to provide the spatial and/or temporal multiplex modes). Time of arrival (TOA) can be estimated using a correlation peak output from the matched filters.

As also shown in FIG. 2, in a multi antenna base station/ multi beam cell phone MIMO configuration, two of the scanning receive antennas (on the receive side) will converge on the two dominant plane waves. Spatial frequency processing enables a matched filter which can discriminate against interfering signals and use the coherent plane waves to increase signal power. It can also be expected that the transfer functions associated with the two beams are uncorrelated.

Also, another multiplex dimension can be added by utilizing polarization diversity in the system 100. For example, modulator 114 or transmitter 115 circuits may be utilized to provide left hand/right hand circular and/or vertical/horizontal polarization in each transmit beam. More particularly, polarization dependent operating modes can then be provided with the use of directional receive antennas 170 and one or more corresponding combining networks 180.

Figure 3B:
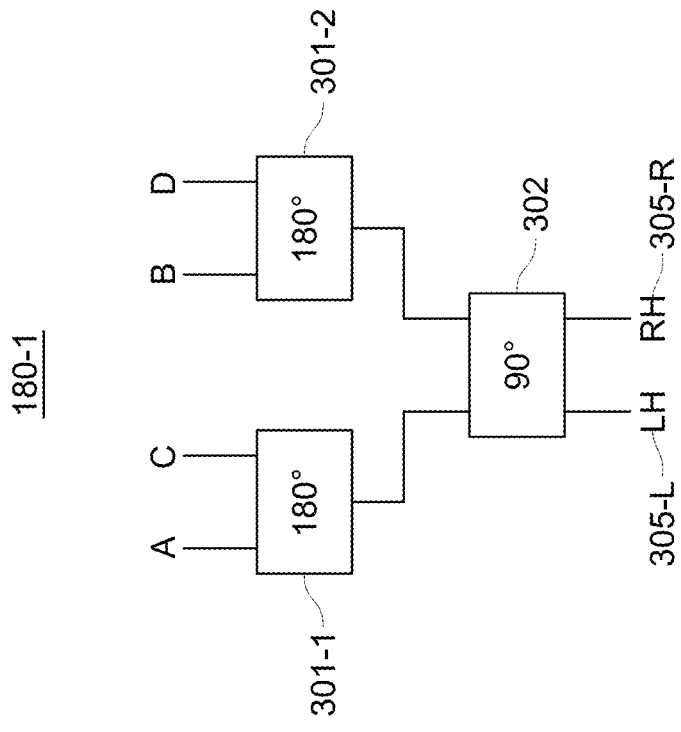
FIG. 3B is a combining circuit used with the antenna of FIG. 3A to provide left-hand and right-hand polarized outputs.
Figure 3A:
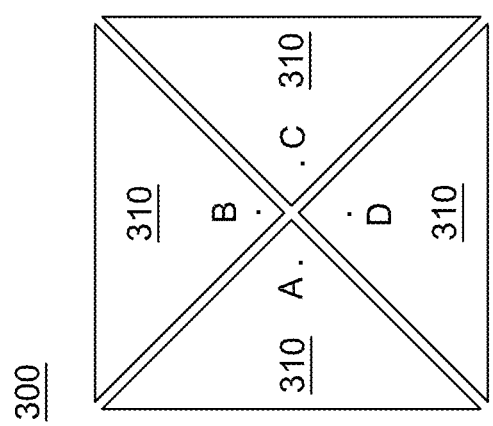
FIG. 3A is a schematic diagram of a directional antenna provided by a pair of crossed bowtie radiators.

In one implementation, the receive antennas 170 may each be a crossed bowtie type antenna 300, as shown in FIG. 3A. One such bowtie antenna 300 uses four generally triangular radiators 310 (or segments) arranged with their apexes adjacent a center point 330. Four feedlines A,B,C, D are connected to a respective one of each of the four triangular radiators 310, typically near the center point. FIG. 3B shows a polarization combining network 180-1 that may be used with the crossed bowtie of FIG. 3A. The four feedpoints are coupled to a pair of 180 degree hybrid combiners 301-1, 301-2 feeding a 90 degree hybrid combiner 302. This combining network 180-1 provides Left Hand (LH) 305-L and Right Hand (RH) 305-H circularly polarized (C-POL) feed points.

It should be understood that other types of combining networks can be used to produce other types of directional and/or polarized signals. For example, a monopole pattern may be derived from the directional elements by feeding the sum ports of the 180 hybrids 301-1, 301-2 into another combiner (not shown). A switch controlled by the controller 199 and decision logic (also in the controller 199) can permit selection of one of these directional operating modes, such as for example, by selecting the mode that produces the highest received power at a given time.

In other embodiments, depending on the desired frequency of operation, the hybrids of FIG. 3B can be replaced by ferrite baluns. In particular, a different technique replaces the ombining network 180-1 with orthogonal transmission line baluns. One balun is connected between feed points A and C and another balun is connected between feed points B and D. More details of this configuration are provided in U.S. Pat. No. 9,118,116 hereby incorporated by reference.

Figure 4B:
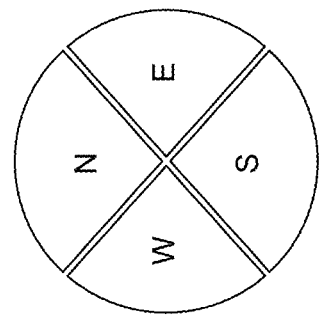
FIGS. 4A and 4B illustrate another type of directional antenna that uses four pairs of crossed dipoles arranged in a cylindrical pattern.
Figure 4A:
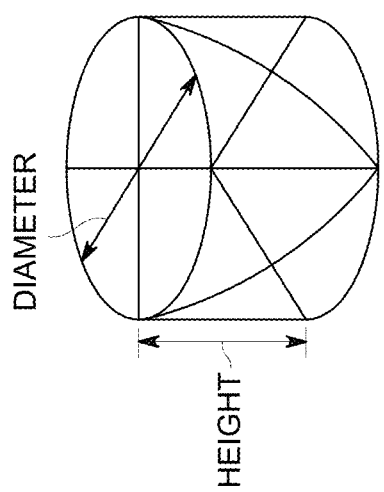

Still other types of directional antennas 170 may be used. FIGS. 4A and 4B is an example of a cylindrical form factor directional antenna 170. The cylindrical form factor has a given height and a diameter; the radiators or antenna segments are provided by metalizing the surface of a cylindrical substrate formed of a dielectric. The cylinder is further divided into four quadrants (North (N), East €, South (S) and West (W)); each quadrant in turn contains four radiating antenna elements similar to a crossed bowtie (in other words, there are a total of 16 radiating elements).

Figure 4C:
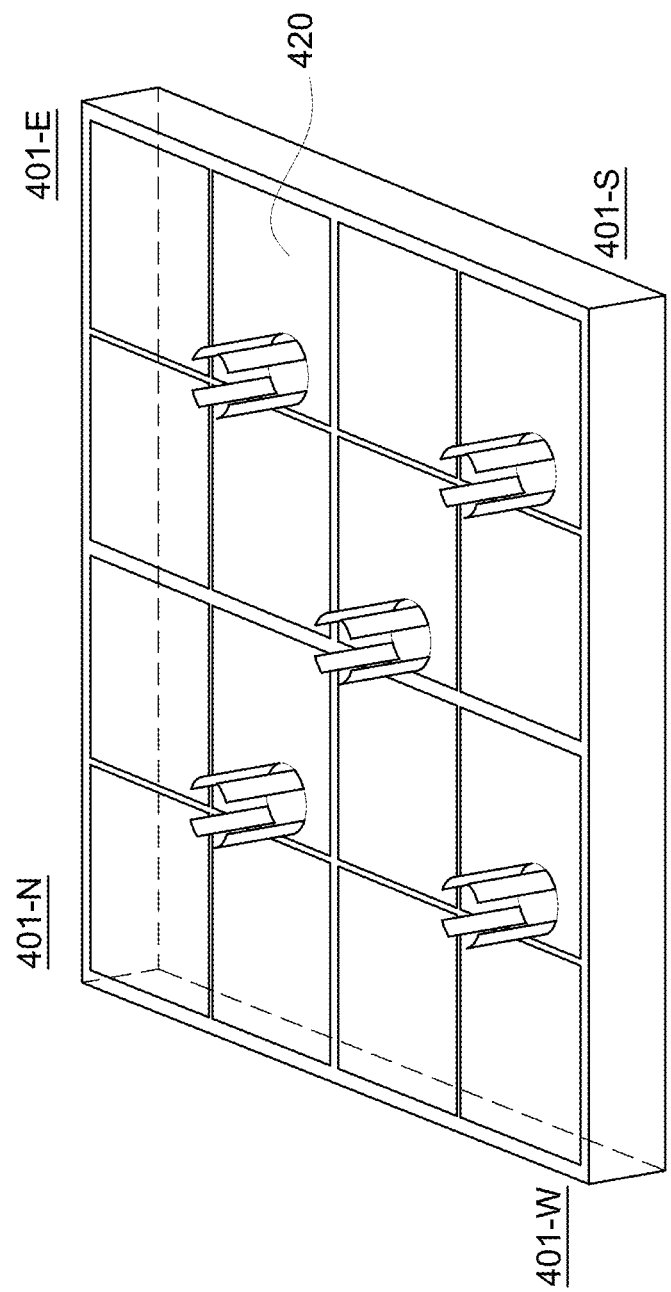
FIG. 4C is another type of directional antenna uses four crossed dipoles arranged in a common plane.

FIG. 4C is another implementation of a four quadrant, four element directional antenna. Here the four "quadrants" or "North, East, South and West" components are actually planar radiating patches or segments disposed on the same planar substrate (over a cavity), rather than on the sides of a hollow cylindrical substrate. As with the FIG. 4A configuration, each quadrant 401-N, 401-E, 401-S, 401-W includes a set of four planar patch elements 420 (only one labelled for clarity) which serve as the two "crossed bowtie" radiators This type of directional antenna is further described in our co-pending U.S. patent application Ser. No. 15/861,749 filed on Jan. 1, 2018, entitled "Low Profile Antenna—Conformal", which is hereby incorporated by reference in its entirety.

Figure 4D:
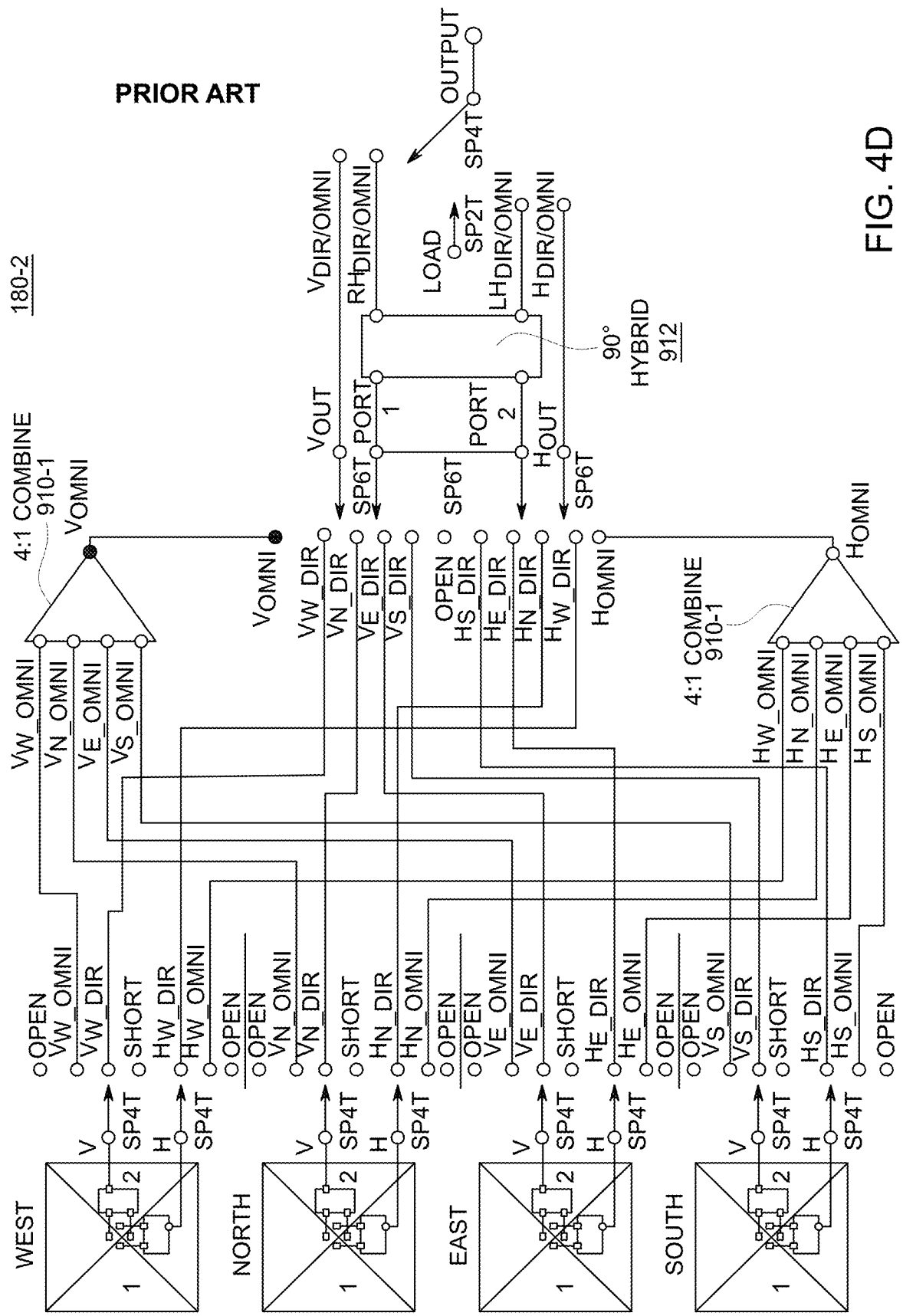
FIG. 4D is an example polarization combining network that can be used with the antennas of FIGS. 4A, 4B and 4C to provide vertical, horizontal, left-hand and right-hand polarization modes.

FIG. 4D is a detailed circuit diagram for a second type of combiner 180-2 that may be used with the directional antennas of FIGS. 4A, 4B and 4C. The diagram shows the interconnection of the four A,B,C,D feeds from each of the N,E,S,W quadrants. A Single Pole Four Throw (SP4T) switch associated with each of the feed points enables selection of an open, omnidirectional, directional, or short connection for respective feed points. These switch outputs are then fed to 4:1 combiners 910-1, 910-2 to provide vertical and horizontal omnidirectional modes, respectively. A 90° hybrid combiner 912 couples through a Single Pole Six Throw (SP6T) switch providing selection of the respective vertical omni or vertical directional mode for each of the N,E,S,W quadrants, or an open circuit. A similar connection is provided on another port (port 2) of the hybrid 912 from the horizontal oriented elements. By connecting the output to a Single Pole Two Throw (SP2T) switch, and feeding the vertical directional/omni, right-hand directional/omni, left-hand directional/omni and the horizontal directional/omni points, the outputs from these various modes can then be selectively activated.

Figure 5A:
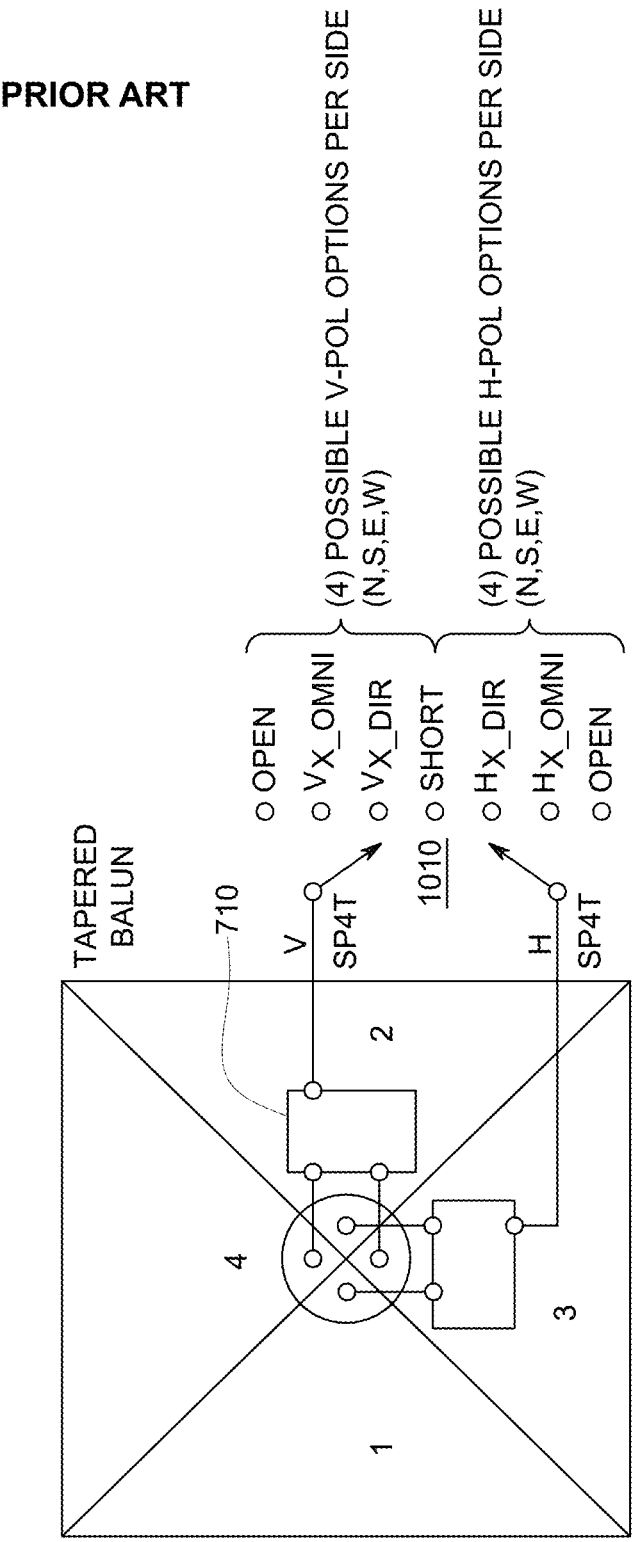
FIG. 5A is a more detailed view of the crossed dipole antenna of FIG. 4A and a switched feed to provide further vertical, horizontal, directional and directional finding operating modes.

FIG. 5A shows more detail of the combiner 180-2 how a given quadrant of the cylindrical implementation of FIG. 4A, or a segment of the embodiment of FIG. 4C) provides a vertical and a horizontal feed point. Here, two ports, that is radiating triangular elements 3 and 4, feed into a tapered balun 710 to provide the vertical polarization output (V). SP4T switch 1010 thus provides multiple output options including open, vertical, omnidirectional, vertical directional, or short for each of the corresponding one of the 5 available face directions (N,E,S,W).

Similar switching is provided to the horizontal feed point of the example side or quadrant where the two ports (that is, elements 1 and 2) feed into a tapered balun to provide the horizontally polarized output (H). The SP4T switch 1010 provides four options again—open circuit, horizontal omni, horizontal directional, or short.

Figure 5B:
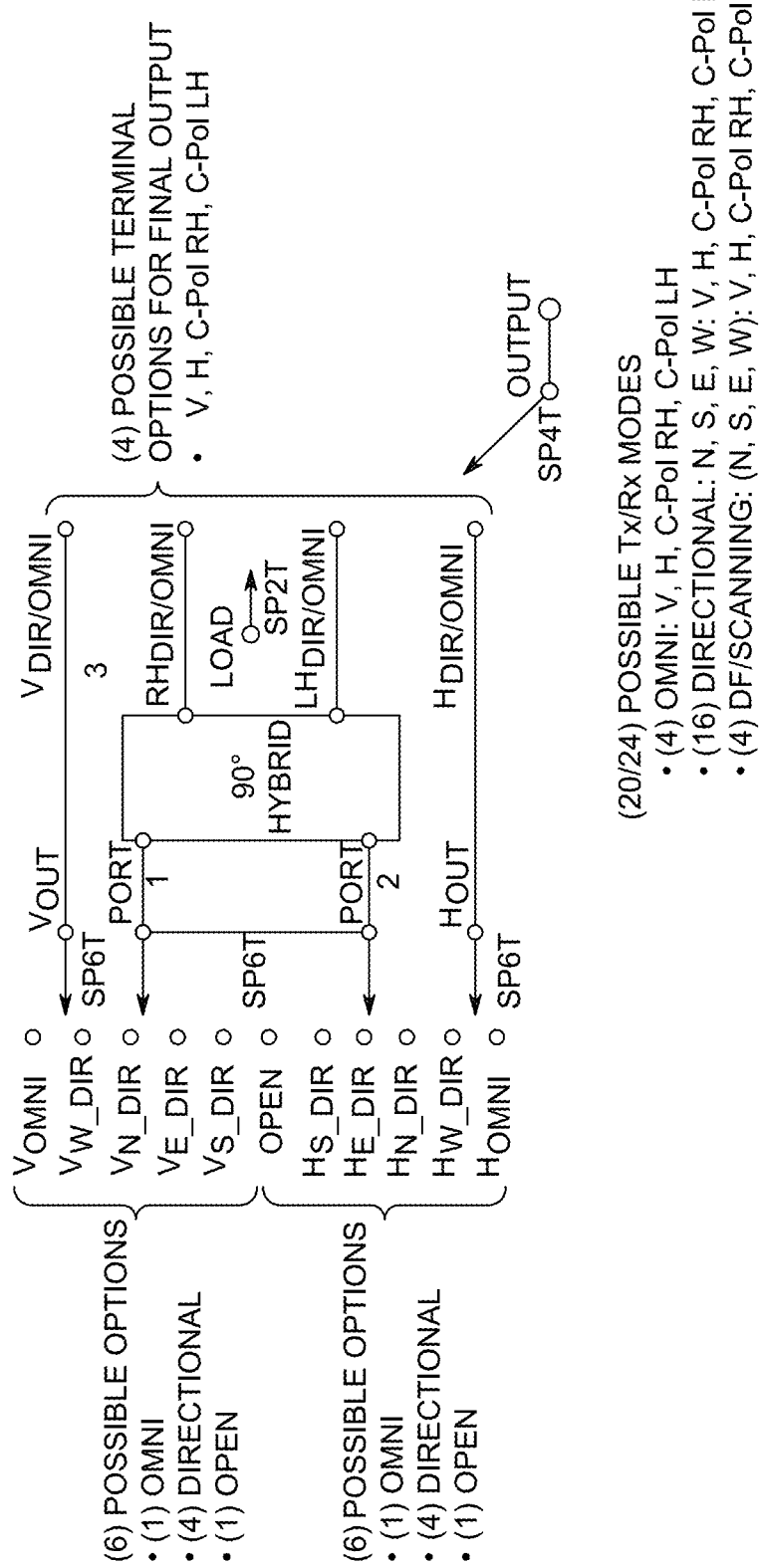
FIG. 5B is a combining circuit that may be used with FIG. 5A.

FIG. 5B shows the 90° hybrid combiner connections in more detail. Here the $V_{out}$ terminal on the second leg is provided through a SP6T switch providing multiple options (vertical omni, vertical North South East or West, directional and open). The $H_{out}$ terminal provides the corresponding six vertical polarized outputs. The second leg and its corresponding SP6T switch also has six corresponding options. See our issued U.S. Pat. No. 9,013,360 incorporated by reference herein for more information.

Figure 6A:
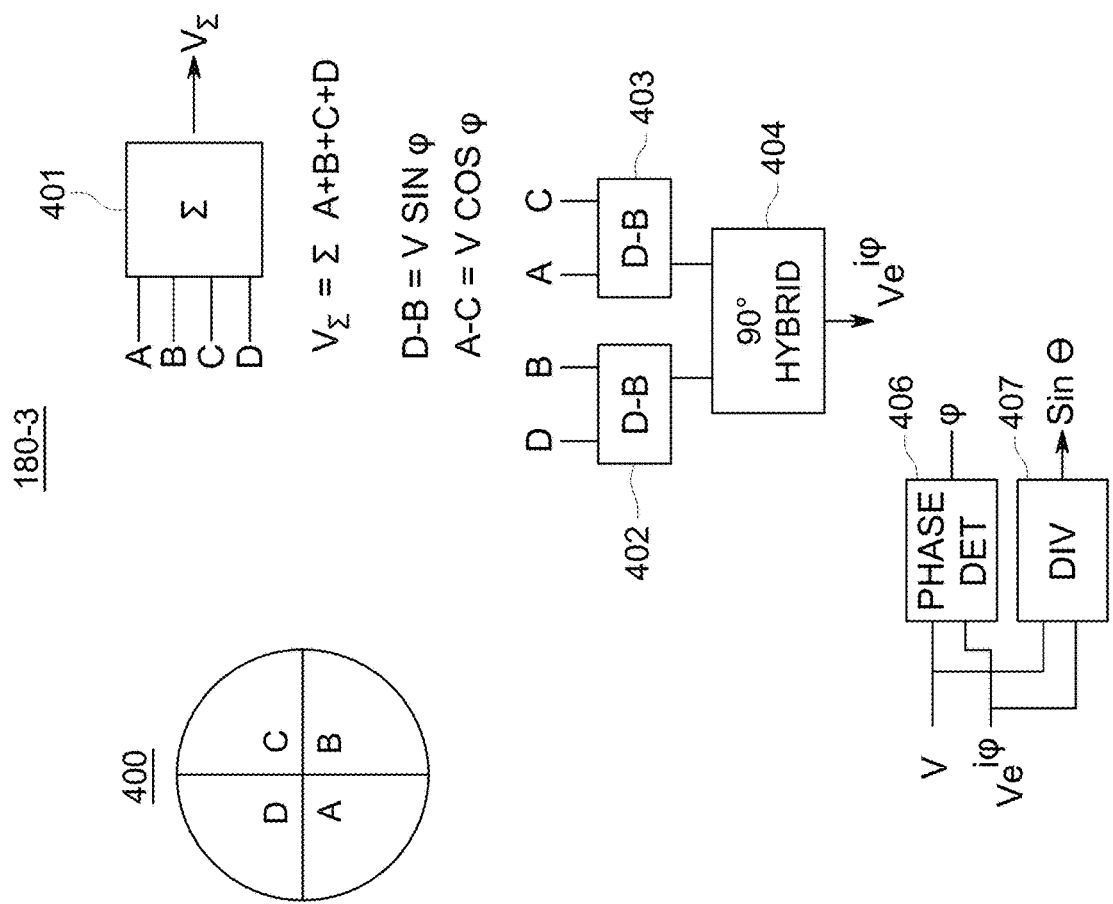
FIG. 6A is another combining circuit used with a crossed dipole antenna to provide receive azimuth and elevation angle estimates.

FIG. 6A is another types of Radio Frequency (RF) combining network 180-3 that may be used in the MIMO system 100 provide an estimate of direction of arrival for both azimuth and elevation. It can be used to produce an orientation independent response from any of the directional antennas 400 previously mentioned such as the crossed bowtie antennas. A combiner 180-3 would typically be provided for each directional antenna element 400.

In this arrangement, a first hybrid combiner 401 produces a signal $V_\Sigma$ representing the sum of signals at the four radiating elements A,B, C, D and, with the suppression of the horizontal component, represents only (or mostly) the vertical component. A second hybrid power combiner 402, which is a difference, or 180° combiner provides an output signal $$D \sim B = v \sin(\varphi))$$

and a third 180° hybrid 403 provides and output signal $$A \sim C = v \cos(\varphi)$$

The outputs of combiners 402, 403 then feed a 90° quadrature hybrid 404 to produce a signal, $$V = v e^{j\varphi}$$

which is proportional to the azimuthal angle.

A phase detector 406 can determine a phase difference 406 between signals $V_E$ and V thus provides the azimuthal angle, cp. A hybrid divider 407 determines the ratio between them, to produce an output proportional to the elevation angle θ.

Figure 6B:
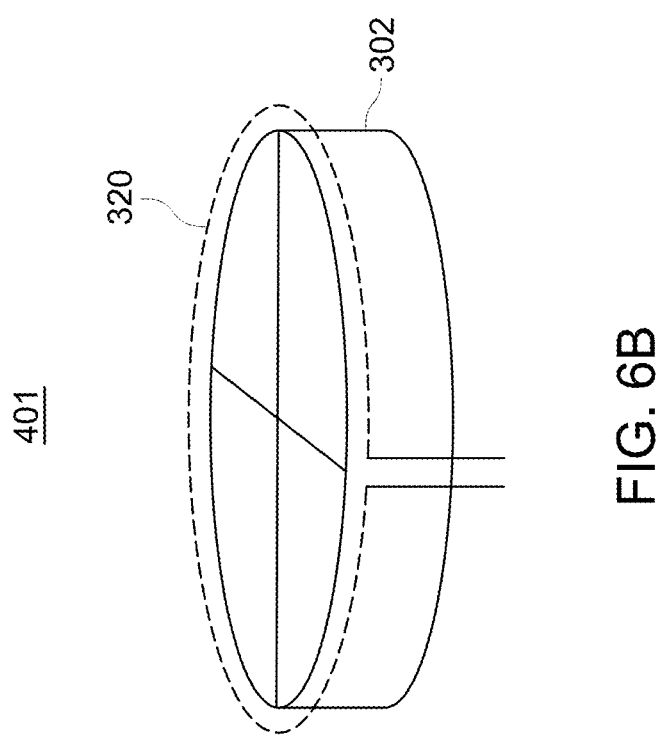
FIG. 6B shows a loop antenna disposed adjacent a crossed dipole element.

Another implementation of the directional antenna element 401 shown in in FIG. 6B can be used where both horizontal and vertical polarized signals are present. A circular wire loop 320 is disposed above the cylindrical radiating element 300.

Figure 6C:
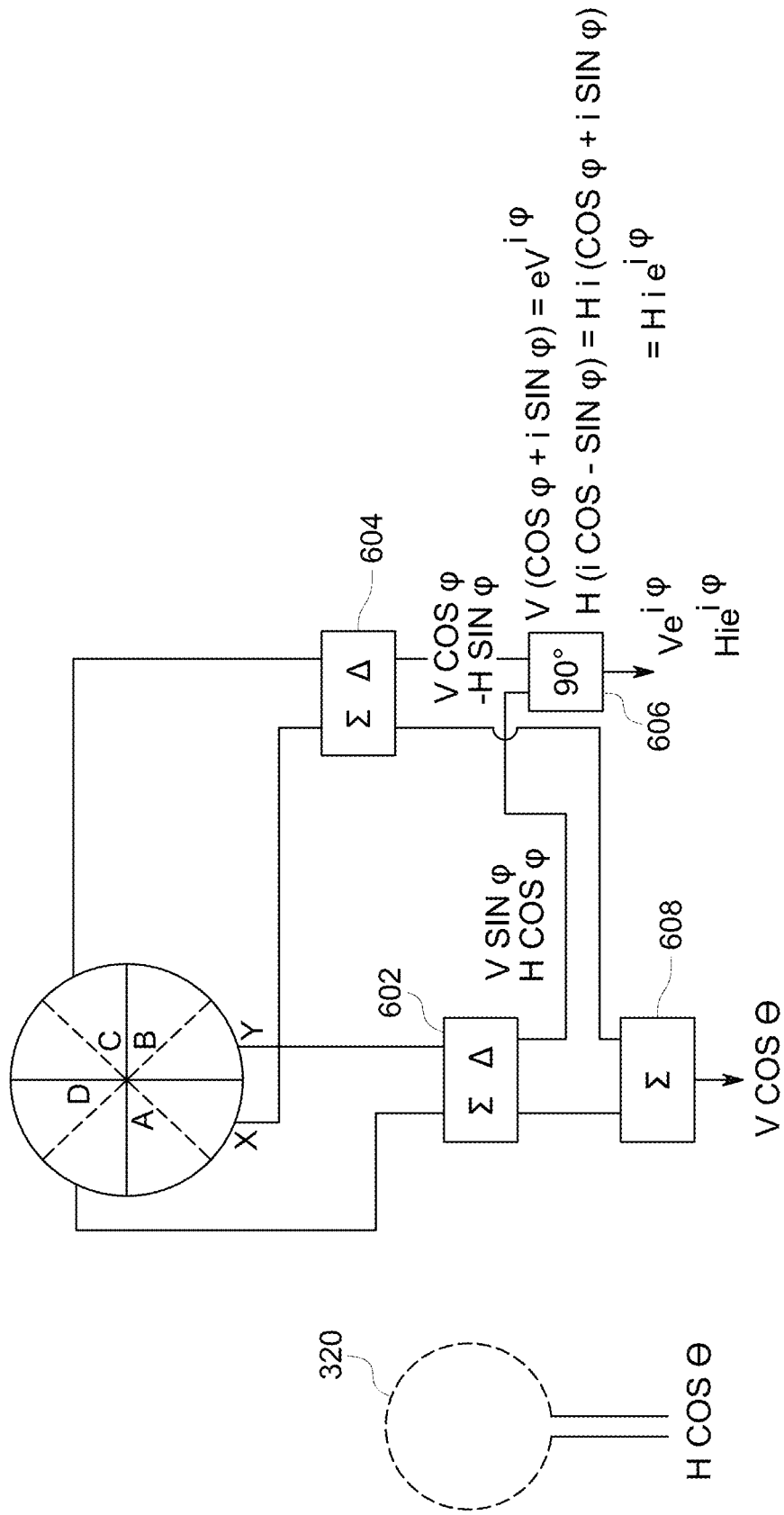
FIG. 6C is an example combining circuit may be used with the antenna of FIG. 6B.

FIG. 6C shows another combining circuit that may be used with the antenna of FIG. 6B. Here, the output of the wire loop 320 can be combined with other signals to produce a signal proportional to the horizontal component $$H \cos \theta$$

Hybrid combiners 602, 604 are 180° combiners that provide both a sum and difference output from radiators A, B, C, D. The 180° hybrid combiners 602, 604, quadrature combiner 606, and combiner 608, arranged as shown, produce signals:

$$V \cos \theta$$

$$V \sin \varphi$$

$$H \cos \varphi$$

$$H \sin \varphi$$

$$V e^{j\varphi}$$

and $$H e^{j\varphi}$$

The resulting signals from the hybrid combiners can be further processed by the signal processor 195 to obtain signals representative of both the azimuth and elevation that are independent of any horizontal component and vertical component. For example, Analog-to-Digital Converter(s) (ADCs) may process the outputs of the hybrid combiners and be fed to one or more Digital Signal Processors (DSPs) to thereby obtain an azimuth and elevation. More information about this approach to determining azimuth and elevation angles can be found in U.S. patent application Ser. No. 15/861,739 filed Jan. 4, 2018 entitled "Indoor Positioning System Utilizing Beamforming with Orientation and Polarization Independent Antennas", the entire contents of which are hereby incorporated by reference. As mentioned above, the same signal processor 195 may also implement the matched filter based on the channel estimate made during the training mode; time of arrival (TOA) is then estimated, in one implementation, using a correlation peak derived from that matched filter output.

What is claimed is:

1. A system comprising:
   a transmit subsystem, comprising two or more transmit antennas,
   arranged in a training mode to transmit a first training signal solely from a first transmit antenna at a first time, and to transmit a second training signal solely from a second transmit antenna at a second time, and
   also arranged in an operating mode to transmit two different signals from the first and second antennas at the same time;
   a receive subsystem comprising
   a plurality of directional receive antennas,
   a plurality of combining circuits connected to the plurality of receive antennas, each combining circuit providing an azimuth output and an elevation output;
   a plurality of receiver circuits, each connected to a respective one of the combining circuits, and
   arranged in the training mode to
   operate the combining circuits to scan the directional receive antennas, and to produce a first set of receive training signals indicative of a first azimuth (φA) and first elevation (φA) output signals when the first transmit antenna is active; and
   operate the combining circuits to scan the directional receive antennas, and to produce a second set of receive training signals indicative of a second azimuth (φB) and second elevation (φB) output signals when the second transmit antenna is active; and
   arranged in the operating mode to
   operating the combining circuits to provide azimuth and elevation operating output signals;

a signal processor, for
- in the training mode, for deriving an azimuth-spatial, elevation-spatial, and temporal-frequency dependent transfer function for each of the first and second set of receive training signals; and
- wherein the signal processor is further for,
- in the operating mode,
  - using the transfer functions as two or more matched filters for
    - determining a first region of coherence for signals emitted from the first one of the transmit antennas, TA, formed around azimuth and elevation angles ($\varphi A$, $\phi A$) and
    - determining a second a region of coherence for signals emitted from the second one of the transmit antennas, TB, formed around azimuth and elevation angles ($\varphi B$, $\phi B$), and thus
  - providing azimuth-spatial and elevation-spatial multiplexing, to thereby enable the transmit subsystem to transmit independent signals at the same time over the same frequencies.

2. The system of claim 1 wherein each directional receiving antenna further comprises a structure having a set of antenna elements, with each set of antenna elements including four radiating segments, and wherein each combiner is further arranged to:
- combine the outputs of two or more radiating segments in each set of elements, to provide two or more of a horizontal, vertical, left hand or right hand polarization mode.

3. The system of claim 1 additionally wherein each of the plurality of directional receiving antennas further comprises four quadrant elements, with each quadrant element further comprising:
- a first pair of the four quadrant elements positioned opposite to one another along a major axis;
- a second pair of the four quadrant elements positioned opposite to one another along the major axis; and
- wherein each combining circuit is further arranged for selectively combining the feed points provided by respective quadrant elements, to provide two or more of a horizontal, vertical, left hand or right hand polarization mode.

4. The system of claim 1 additionally wherein each of the plurality of directional receiving antennas further comprises four quadrant radiating elements, with each quadrant element further comprising:
- a first pair (A,C) of the four radiating elements positioned opposite to one another along a major axis;
- a second pair (B,D) of the four radiating elements positioned opposite to one another along the major axis; and each combiner circuit further comprising:
- a first hybrid combiner to produce a signal $V_\Sigma$ representing the sum of signals at the four radiating elements A, B, C, D;
- a second hybrid combiner to provide a signal $D-B=v\sin(\varphi)$;
- a third hybrid combiner to provide a signal $A-C=v\cos(\varphi)$;
- a fourth hybrid combiner receiving the outputs of the second and third hybrid combiner to to produce a signal $V=ve^{j\varphi}$ which is proportional to azimuthal angle;
- a phase detector to determine a phase difference between signals $V_\Sigma$ and V to provide a signal representative of receive azimuthal angle, $\varphi$, and
- a hybrid divider to determines a ratio between signals $V_\Sigma$ and V to produce a signal representative of receive elevation angle $\theta$.

* * * * *